United States Patent
Keller et al.

[11] Patent Number: 5,835,362
[45] Date of Patent: Nov. 10, 1998

[54] CURRENT CONDUCTOR ARRANGEMENT

[75] Inventors: Markus Keller, Luterbach, Switzerland; Jochen Rees, Waldshut, Germany; Alexander Stoev, Zürich, Switzerland

[73] Assignee: Asea Brown Boveri AG, Baden, Switzerland

[21] Appl. No.: 615,948

[22] Filed: Mar. 14, 1996

[30] Foreign Application Priority Data

Apr. 7, 1995 [DE] Germany ................ 195 12 679.3

[51] Int. Cl.⁶ .................................................. H02M 5/45
[52] U.S. Cl. ........................... 363/37; 174/74 R; 307/43; 363/144
[58] Field of Search .................. 174/72 R, 88 R, 174/95, 149 R, 70 R, 71 R, 71 B, 72 A, 72 B, 99 B; 363/37, 144; 307/147, 43

[56] References Cited

U.S. PATENT DOCUMENTS

| | | |
|---|---|---|
| 3,895,285 | 7/1975 | Bardahl et al. ...................... 363/141 |
| 4,008,365 | 2/1977 | Carlson ................................ 174/68.2 |
| 4,670,833 | 6/1987 | Sachs . | |
| 4,967,162 | 10/1990 | Barnett et al. ....................... 330/43 |
| 5,055,721 | 10/1991 | Majumdar et al. .................. 327/434 |
| 5,172,310 | 12/1992 | Deam et al. . | |
| 5,187,652 | 2/1993 | Steimer ................................ 363/37 |
| 5,347,166 | 9/1994 | Schauder . | |
| 5,365,424 | 11/1994 | Deam et al. ......................... 363/144 |
| 5,513,077 | 4/1996 | Stribel ................................. 361/794 |

FOREIGN PATENT DOCUMENTS

| | | |
|---|---|---|
| 3420535A1 | 12/1985 | Germany . |
| 3609065A1 | 9/1987 | Germany . |
| 3835751A1 | 4/1990 | Germany . |
| 4105155A1 | 9/1992 | Germany . |
| 4232763A1 | 3/1994 | Germany . |
| 94/29885 | 12/1994 | WIPO . |

Primary Examiner—Michael L. Gellner
Assistant Examiner—Dhiru R. Patel
Attorney, Agent, or Firm—Burns, Doane, Swecker & Mathis, L.L.P.

[57] ABSTRACT

In order to reduce the commutation inductance of series-connected controllable semiconductor components (V1–V6), the latter are connected, in an essentially orthogonal manner and at a predeterminable distance (a), via spur double striplines (6, 6') to essentially planar main lines (5, 5'). All of the double striplines (5, 5'; 6, 6') have a layered structure and are mutually insulated by a thin insulating layer (7), with the result that a minimum current area is achieved. The controllable semiconductor components (V1–V6) are accommodated closely adjacent to freewheeling diodes in a module (10), the heat of which can be dissipated by cooling elements (8). Bipolar transistors having an insulated gate (IGBTs) are preferably used as controllable semiconductor components (V1–V6).

6 Claims, 1 Drawing Sheet

CURRENT CONDUCTOR ARRANGEMENT

BACKGROUND OF THE INVENTION

1. Field of the Invention

The invention is based on a current conductor arrangement according to the preamble of patent claim 1. The invention also relates to uses of this current conductor arrangement.

2. Discussion of Background

With the preamble of patent claim 1, the invention refers to a prior art such as is disclosed in DE 3 609 065 A1. That document gives a specification of low-inductance double rails for a phase module of an inverter having in each case one GTO thyristor between a potential terminal and a load terminal. The components for turning off the GTO thyristors are connected to these double rails via a spur line having 4 electrical busbars. A low-inductance series circuit for a plurality of controllable semiconductor components between a potential terminal and a load terminal is not disclosed in that document.

DE 4 105 155 A1 gives a specification of a current converter circuit arrangement in which the switchable component and the freewheeling diode of the commutation path are provided closely adjacent in order to minimize the inductances and consequently the induced overvoltages. Bipolar transistors, field-effect transistors, IGBTs or GTOs can be used as switchable components. This current converter circuit is not suitable for operating voltages greater than those which can be tolerated by a single semiconductor component.

SUMMARY OF THE INVENTION

Accordingly, one object of the invention, as it is defined in patent claim 1, is to provide a novel current conductor arrangement of the type mentioned in the introduction which is further developed to give a smaller leakage inductance when a plurality of disconnectable semiconductor components are electrically connected in series between a potential terminal and a load terminal.

Advantageous refinements of the invention are defined in the dependent patent claims.

One advantage of the invention is that the electrical losses become lower due to the lower leakage inductance.

The low-inductance current conductor arrangement permits a modular structure and good compensation of mechanical forces which are caused by different thermal expansions. Strong mechanical forces and torques are not exerted on semiconductor components to be connected. No holes or bushings are required in the insulation of the double striplines.

According to an advantageous refinement of the invention, the necessary outlay on circuitry for the controllable semiconductor components is reduced when bipolar transistors having an insulated gate (IGBTs) are used as controllable semiconductor components. This enables the current converter costs to be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, herein.

DESCRIPTION OF THE PREFERRED EMBODIMENTS

Figure 1:
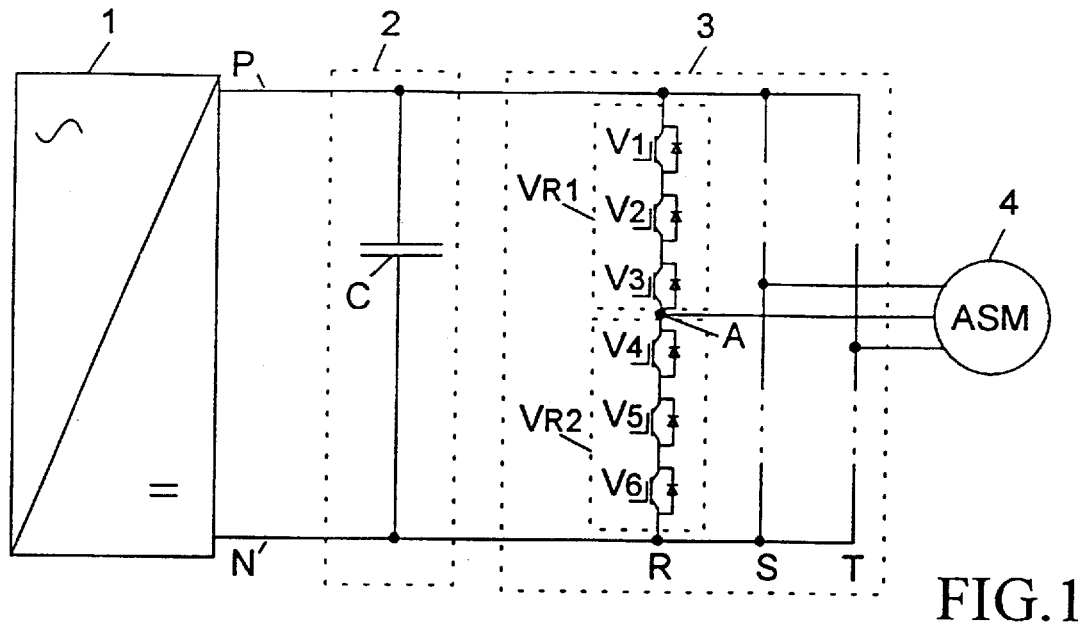
FIG. 1 shows a converter having a DC voltage link, the inverter of which converter has, for each AC phase, 2 bridge paths having controllable semiconductor components connected in series.

Referring now to the drawings, wherein like reference numerals designate identical or corresponding parts throughout the several views, FIG. 1 shows a block diagram of a converter, comprising a rectifier (1), a DC voltage link (2) and an inverter (3), which is connected on the AC side, via a load terminal (A), to an AC load or to an asynchronous machine (4). The DC voltage link (2) comprises a capacitor (C) which is electrically connected at one end to a positive terminal (P) and at the other end to a negative terminal (N) of the rectifier (1).

The inverter (3) has, for each AC phase (R, S, T), 2 low-inductance bridge paths of identical structure, of which only the bridge paths ($V_{R1}$, $V_{R2}$) for the AC phase (R) are illustrated for reasons of clarity. The bridge path ($V_{R1}$) has 3 series-connected controllable semiconductor components (V1, V2, V3) and the bridge path ($V_{R2}$) has 3 series-connected controllable semiconductor components (V4, V5, V6). Bipolar transistors, field-effect transistors, gate turn-off thyristors (GTOS) and, preferably, bipolar transistors having an insulated gate (IGBTs) can be used, for example, as controllable semiconductor components (V1–V6). A freewheeling diode is reverse-connected in parallel with every controllable semiconductor component (V1–V6).

Figure 2:
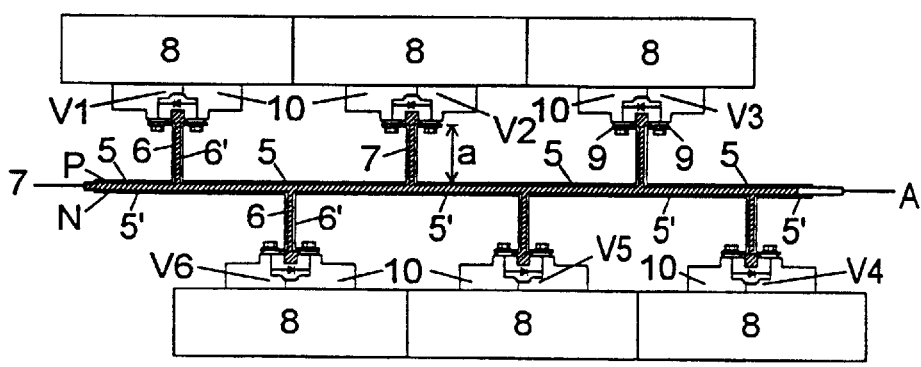
FIG. 2 shows 2 inverter bridge paths according to FIG. 1 with a load terminal, adjacent to and directly opposite DC voltage supply lines.

FIG. 2 shows a low-inductance circuit arrangement of the bridge paths ($V_{R1}$, $V_{R2}$) according to FIG. 1, bipolar transistors having an insulated gate (IGBTs) being used as the controllable semiconductor components (V1–V6). A planar 1st stripline or main stripline (5) is connected at one end to the positive terminal (P) and at the other end to the load terminal (A). A planar 2nd stripline or main stripline (5') is connected at one end to the negative terminal (N) and at the other end likewise to the load terminal (A). Both the 1st and 2nd main striplines (5, 5') have a rectangular cross-section, the width of which is much greater than its thickness; their broad sides are situated opposite one another and they are separated only by as thin an insulating layer (7) as possible, having a thickness of, for example, 2 mm, and together with the insulating layer (7) they form a main double stripline (5, 5'). Branching upwards and downwards in an essentially orthogonal manner from the planar main double stripline (5, 5') are in each case 3 spur double striplines (6, 6') made of 2 spur striplines (6, 6') which are mutually insulated by the insulating layer (7). Each spur line (6, 6') has, angled at its end, a component terminal end (9) for electrical connection to a respective module (10), in which a controllable semiconductor component (V1, V2, V3) having an integrated freewheeling diode is accommodated. The same is correspondingly true for the controllable semiconductor components (V4–V6) which are downwardly connected to the 2nd main stripline (5') and in this way are electrically connected in series just like the controllable semiconductor components (V1–V3). During operation, a load current of, for example, 600 A can be picked off at the common load terminal (A) of both the 1st and 2nd main striplines (5, 5').

Arranged in parallel with and on both sides of the main double stripline (5, 5') are cooling elements (8), which are in readily thermally conducting contact with the controllable semiconductor components (V1–V6) and freewheeling diodes and dissipate the heat loss of the semiconductors.

Figure 3:
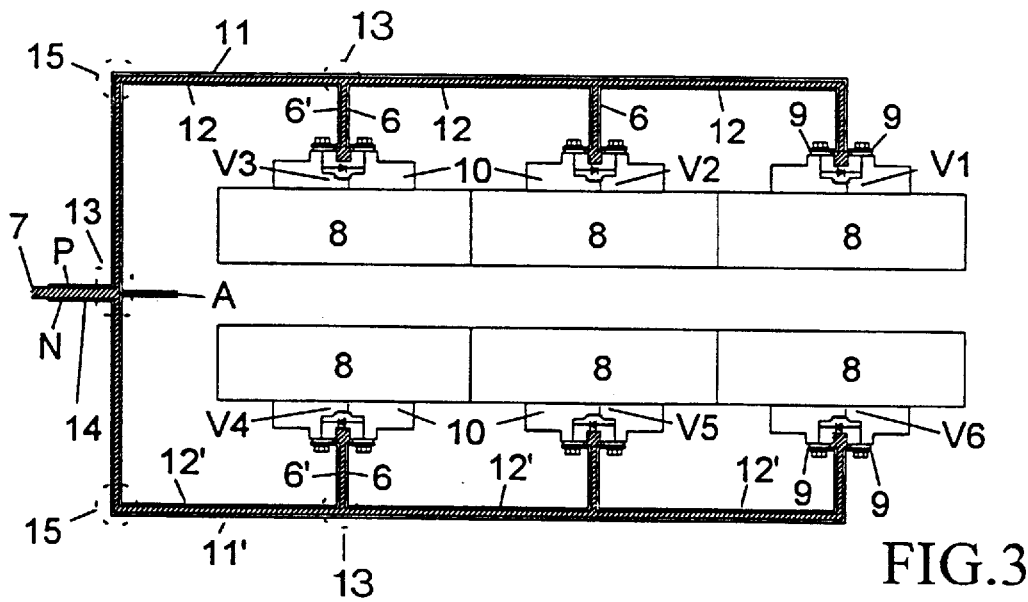
FIG. 3 shows 2 inverter valve paths according to FIG. 1, in which the load terminal is arranged at one end of main striplines and the DC voltage supply lines are arranged at the other end of said main striplines.

FIG. 3 shows a low-inductance current conductor arrangement of the bridge paths ($V_{R1}$, $V_{R2}$) according to FIG. 1 as a modification of FIG. 2. Instead of a single, unbent main double stripline (5, 5'), as in FIG. 2, in this case a bent double stripline or main double stripline (11, 12; 11', 12') having a plurality of branches (13) for double striplines (6, 6'; 14; A) is provided for each bridge path ($V_{R1}$, $V_{R2}$). The cooled modules (10) are connected via spur double striplines (6, 6') in the same way as in FIG. 2. The main striplines (12, 12') are short-circuited in the load terminal (A) which is situated between the bridge paths ($V_{R1}$, $V_{R2}$). The double stripline (14) is connected at one end to the positive terminal (P) and the negative terminal (N) and at the other end to the main double striplines (11, 11').

The spur lines (6, 6') with the controllable semiconductor components (V1–V6) connected to them can be arranged outwardly, for example turned through 180°, with respect to the main double striplines (11, 12; 11', 12') instead of inwardly as illustrated in FIG. 3, the spur lines (6, 6') then being connected (not illustrated) to the main striplines (11) and (11'), respectively.

Instead of being bent at angles (15), the main double striplines (11, 12; 11', 12') may also be designed to be stretched in one plane (not illustrated). The double line (14) does not have to be arranged opposite the load terminal (A).

It is important that the current area enclosed by the load current be as small as possible, in order to obtain the lowest possible inductance of the current conductor arrangement. The controllable semiconductor components (V1–V6) are to be arranged as closely adjacent as possible to the associated freewheeling diodes. Furthermore, the distance between adjacent modules (10) as well as between the modules (10) and the current terminals (P, N), on the one hand, and the load terminal (A), on the other hand, is to be as small as possible.

In principle, as many modules (10) having controllable semiconductor components (V1–V3; V4–V6) as are desired can be arranged and connected in series in the manner illustrated in FIGS. 2 and 3.

A predeterminable distance (a) between a module (10) and a main plane of a main stripline (5, 5'; 12, 12'), or the length of the 1st and 2nd valve striplines (6, 6'), see FIG. 2, should lie in the range of 3 cm–10 cm, preferably in the range of 5 cm–7 cm, in order to be able to compensate for any differences in thermal expansion in the various modules (10).

It goes without saying that the converter (1–3) can also be designed for other ratings instead of for the above-specified current values. A 3-point current converter could, of course, be provided (not illustrated) instead of a 2-point converter (3), such as is illustrated in FIG. 1. In addition, protective devices and semiconductor component circuits such as those which are customary in connection with current converters but are not illustrated could also be provided.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

| | |
|---|---|
| 1 | Rectifier |
| 2 | DC voltage link |
| 3 | Inverter |
| 4 | Asynchronous machine, AC load |
| 5 | 1st stripline, main stripline |
| 5' | 2nd stripline, main stripline |
| 6, 6' | Spur line |
| 7 | Insulation, insulation layer |
| 8 | Cooling element, semiconductor heat sink |
| 9 | Component terminal end |
| 10 | Module having a controllable semiconductor component V1 (V2 . . . ) and freewheeling diode |
| 11, 11'; 12, 12' | Main stripline |
| 13 | Branches |
| 14 | Double line |
| 15 | Angle |
| a | Distance |
| A | Load terminal |
| C | Link capacitor |
| N | Negative terminal |
| P | Positive terminal |
| R, S, T | AC phases |
| V1–V6 | Controllable semiconductor components |
| $V_{R1}$, $V_{R2}$ | Bridge paths of R |

What is claimed as new and desired to be secured by Letters Patent of the United States is:

1. A power lead arrangement having at least two series-connected, controllable electrical semiconductor elements, and a) having at least first and second main striplines for providing current supply and current return leads;

b) which are separated from one another by an electric insulator or insulating layer such that two of the main striplines each form one main double stripline;

c) said first and second main striplines being electrically connected to component terminal ends via at least two spur striplines;

d) said at least two spur striplines being separated from one another by an electric insulator or insulating layer such that said at least two spur striplines form one spur double stripline;

e) at least two adjacent spur double striplines of predetermined length being connected electrically in series, on a same potential side of the main double stripline via at least one of said controllable electrical semiconductor components, and f) not being connected directly to a load terminal.

2. The power lead arrangement as claimed in claim 1, wherein a) first and second current connecting strips for first and second voltage potentials of the main double stripline are separated at a branch, and b) the spur double striplines are connected to two load connecting strips which are electrically connected to the load terminal.

3. The power lead arrangement as claimed in claim 2, wherein each two of the spur double striplines are arranged essentially opposite one another.

4. The power lead arrangement as claimed in claim 1, wherein the spur double striplines have a predeterminable length in the range of 5 cm–7 cm, in such a way that the component terminal ends are at a distance from a main plane of the first and second main striplines which is at least as large as said predeterminable length.

5. The power lead arrangement as claimed in claim 1, wherein the spur double stripline are arranged essentially orthogonally with respect to said predetermined length or a main plane of the main striplines.

6. The power lead arrangement as claimed in claim 5, wherein a) the spur double striplines are connected to opposed potential sides of said one main double stripline; and
b) the main double stripline has said load terminal on its end.

* * * * *